(12) United States Patent
Webster et al.

(10) Patent No.: US 9,148,515 B1
(45) Date of Patent: *Sep. 29, 2015

(54) INTERNATIONAL CONFERENCING VIA GLOBALLY DISTRIBUTED CASCADING SERVERS

(71) Applicant: West Corporation, Omaha, NE (US)

(72) Inventors: Craig A. Webster, Omaha, NE (US);
Myron P. Sojka, Logan, IA (US);
Michael T. Mateer, Omaha, NE (US);
Srinivas Maganti, Vijayawada (IN)

(73) Assignee: West Corporation, Omaha, NE (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/154,805

(22) Filed: Jan. 14, 2014

Related U.S. Application Data

(63) Continuation of application No. 11/676,632, filed on Feb. 20, 2007, now Pat. No. 8,670,538, which is a continuation-in-part of application No. 11/099,994, filed on Apr. 6, 2005, now abandoned.

(60) Provisional application No. 60/559,994, filed on Apr. 6, 2004.

(51) Int. Cl.
| | |
|---|---|
| *H04M 3/42* | (2006.01) |
| *H04M 3/56* | (2006.01) |
| *H04L 29/06* | (2006.01) |

(52) U.S. Cl.
CPC .............. *H04M 3/56* (2013.01); *H04L 65/403* (2013.01)

(58) Field of Classification Search
CPC .............. H04M 3/567; H04M 7/006; H04M 2203/5063; H04M 3/56

USPC .............. 379/202.01, 220.01; 370/260–271, 370/352–354

See application file for complete search history.

(56) References Cited

U.S. PATENT DOCUMENTS

| | | | |
|---|---|---|---|
| 5,027,387 | A | 6/1991 | Moll |
| 5,631,904 | A | 5/1997 | Fitser et al. |
| 5,825,858 | A | 10/1998 | Shaffer et al. |
| 5,883,964 | A | 3/1999 | Alleman |
| 5,987,112 | A | 11/1999 | Chakravarti et al. |
| 6,035,027 | A | 3/2000 | Alleman |
| 6,144,667 | A | 11/2000 | Doshi et al. |
| 6,212,268 | B1 | 4/2001 | Nielsen |
| 6,236,644 | B1 | 5/2001 | Shuman et al. |
| 6,253,249 | B1 | 6/2001 | Belzile |
| 6,307,928 | B1 | 10/2001 | Yamasaki |
| 6,438,111 | B1 | 8/2002 | Catanzaro et al. |

(Continued)

OTHER PUBLICATIONS

Spectel, Grand Scale Global Conferencing Power, www.spectral.com Apr. 13, 2005.

(Continued)

*Primary Examiner* — Oleg Asanbayev

(57) ABSTRACT

A method, a computer readable medium and a system for international conferencing via globally distributed cascading media servers that comprises, receiving a local participant audio packet at a local conferencing media server in a conference call, summing the local participant audio packet by the local conferencing media server, receiving a distal participant audio packet at a distal conferencing media server, summing the distal participant audio packet by the distal conferencing media server, and interfacing the local conferencing media server with the distal conferencing media server.

10 Claims, 8 Drawing Sheets

(56) References Cited

U.S. PATENT DOCUMENTS

| | | |
|---|---|---|
| 6,453,034 B1 | 9/2002 | Donovan et al. |
| 6,512,764 B1 | 1/2003 | Carew et al. |
| 6,549,229 B1 | 4/2003 | Kirby et al. |
| 6,584,076 B1 | 6/2003 | Aravamudan et al. |
| 6,594,257 B1 | 7/2003 | Doshi et al. |
| 6,693,661 B1 | 2/2004 | Vanderwilt et al. |
| 7,174,346 B1 | 2/2007 | Gharachorloo et al. |
| 7,412,486 B1 | 8/2008 | Petrack et al. |
| 7,668,916 B2 | 2/2010 | Chu et al. |
| 2001/0002927 A1 | 6/2001 | Detampel, Jr. et al. |
| 2001/0054070 A1 | 12/2001 | Savage, III et al. |
| 2002/0087858 A1 | 7/2002 | Oliver et al. |
| 2003/0026406 A1 | 2/2003 | Ernstrom et al. |
| 2003/0103468 A1 | 6/2003 | Seavers et al. |
| 2003/0112947 A1 | 6/2003 | Cohen |
| 2003/0118160 A1 | 6/2003 | Holt et al. |
| 2003/0185362 A1 | 10/2003 | Kim |
| 2004/0062210 A1 | 4/2004 | Genter et al. |
| 2005/0135280 A1 | 6/2005 | Lam |
| 2007/0217589 A1 | 9/2007 | Martin et al. |

OTHER PUBLICATIONS

Vail, Vail Conferencing, www.vailsys.com, 2003.

INTERNATIONAL CONFERENCING VIA GLOBALLY DISTRIBUTED CASCADING SERVERS

CROSS REFERENCE TO RELATED APPLICATIONS

The present patent application is a continuation from patent application Ser. No. 11/676,632 filed on Feb. 20, 2007, entitled INTERNATIONAL CONFERENCING VIA GLOBALLY DISTRIBUTED CASCADING SERVERS, which is a continuation-in-part and claims the benefit of patent application Ser. No. 11/100,323, filed on Apr. 6, 2005, entitled CALL REDIRECT VIA CENTRALIZED BRIDGES, now issued U.S. Pat. No. 8,238,536, and patent application Ser. No. 11/099,994, filed on Apr. 6, 2005 entitled INTERNATIONAL CONFERENCING USING DISTRIBUTED CONFERENCE PLATFORMS LINKED VIA A PRIVATE NETWORK, the entire contents of which are incorporated by reference herein.

FIELD OF THE DISCLOSURE

The embodiment of the disclosure relates generally to an improved international conferencing architecture and in particular the embodiment of the disclosure provide a method and apparatus for routing conference calls between countries via an Internet Protocol (IP) based architecture. Still more particularly, the embodiment of the disclosure provides a method and apparatus for routing conference calls between countries via globally distributed cascaded media servers.

BACKGROUND OF THE DISCLOSURE

Current international conferencing methods utilize circuit based Time Division Multiplexing (TDM) technologies which require expensive, dedicated, international circuits to be leased by service providers in order for conference users in once country to join a conference call in another country. With the increase of overall economic globalization, the requirement for international conferencing has increased dramatically. With this increase, it is no longer cost effective for service providers and enterprises to use dedicated circuit based technologies to service this need.

Therefore, what is needed is an international conferencing solution that overcomes these cost limitations by providing a method by which conference calls between countries can utilize non-dedicated packet based technologies. This solution allows the service provider or enterprise to utilize local TDM or data connectivity to interface conference participants to local conferencing servers in each country and link the conferencing servers between countries via the packet based, connectionless Wide Area Network (WAN).

SUMMARY OF THE DISCLOSURE

The embodiment of the disclosure solves the problem of requiring conference call participants to utilize expensive circuit based technologies when joining conference calls from another country. The mechanism of the embodiment of the disclosure uses localized IP based conferencing servers at each international site for conference participants to access. Conference participants access these conference servers via local TDM or Voice over Internet Protocol (VoIP) technologies.

Conference participants dial a pre-defined access number to access the localized conferencing server via the Media Gateway. The Media Gateway, after validation of each participant, queries the participant for required information in order to establish the participant into a specific conference call. Once this information is obtained from the participant, the Media Gateway passes this information to an Application Server for proper routing.

The Application Server communicates with the Conferencing Database to determine if the requested conference call is currently setup and allocated resources or this participant is first to join the call. Assuming conference call is underway, Conferencing Database tells Application Server which Conferencing Media Server is hosting the specific conference call. Application Server then determines if the specific, allocated Conferencing Media Server has resources available for another participant to join. Assuming resources available, Application Server reserves Conferencing Media Server resource and communicates with Media Gateway the actual resource allocated.

Participant is then connected to the Conferencing Media Server via the Media Gateway and is joined into the conference call. The Conferencing Media Server multiplexes multiple participants' audio transactions into one Real Time Protocol (RTP) stream for interfacing with the opposite end international Conferencing Media Server. All participants on the conference call are supplied each other's audio feed via the localized Conferencing Media Server.

Other aspects of the embodiment of the disclosure will become apparent to those skilled in the art upon review of the following description of specific embodiments of the disclosure in conjunction with the accompanying figures.

In one embodiment of the disclosure a method of international conferencing via globally distributed cascading media servers that comprises, receiving a local participant audio packet at a local conferencing media server in a conference call, summing the local participant audio packet by the local conferencing media server, receiving a distal participant audio packet at a distal conferencing media server, summing the distal participant audio packet by the distal conferencing media server, and interfacing the local conferencing media server with the distal conferencing media server.

In a further embodiment of the disclosure a computer readable medium that comprises instructions for, validating a participant for a conference call, querying the participant for conference call information, determining which conferencing media server will host the conference call, managing resource allocation of the conferencing media server for the conference call, and connecting the participant to the conference call.

In yet a further embodiment of the disclosure a system for system of international conferencing via globally distributed cascading media servers that comprises, a media gateway communicably connected to a participant of a conference call, a provisioning database communicably connected to the media gateway for validating the participant, a conferencing media server communicably connected to the media gateway, an application server communicably connected to the conferencing media server and the media gateway for routing the conference call, and a conferencing database communicably connected to the application server for tracking conference call status.

DETAILED DESCRIPTION OF AN EMBODIMENT OF THE DISCLOSURE

Figure 1:
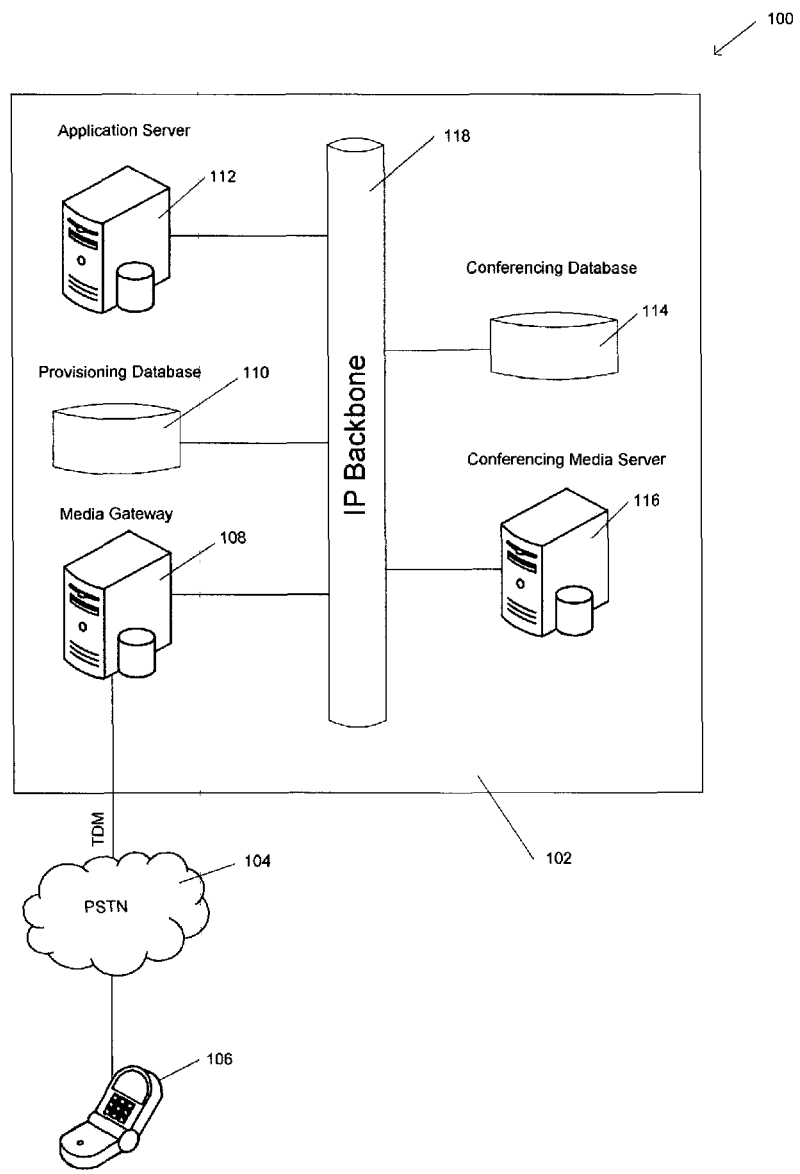
FIG. 1 depicts a local conferencing scenario in accordance with a preferred embodiment of the embodiment of the disclosure.

With reference to the figures and in particular with reference to FIG. 1, a diagram of a conferencing scenario 100 is depicted in accordance with a preferred embodiment of the embodiment of the disclosure. The conferencing system 102 in FIG. 1 is a typical representation of a conferencing system that utilizes an Internet Protocol (IP) based backbone distributed architecture. In addition, also depicted in figure is a Public Switched Telephone Network (PSTN) 104. In the figure, interfacing the conferencing system and the PSTN is a Time Division Multiplexing (TDM) interface or T1 line. The interface between the conferencing system and the PSTN can be any communication interface that is supported by both ends. T1 lines will be used in these illustrations since this medium is well known in the art. Conferencing Participant 106 is connected to the Conferencing System through the PSTN. Conferencing participants can be in the form of any medium capable of successfully communicating with the PSTN. It should also be noted that participants do not need to be routed through the PSTN. In some instances, IP phones or even wireless systems could be routed directly to the Media Gateway without needing to route through the local PSTN.

Continuing to reference FIG. 1, Conferencing System is made up of multiple communication entities. It should be noted that each device represented can have multiple instances within the architecture. FIG. 1 depicts only one instance of each entity for simplification purposes. Media Gateway 108 is used to interface with the PSTN or other external network entities. It serves as the participant interface and collects and distributes participant information as needed. Provisioning Database 110 is used for validating conferencing information sent to it by the Media Gateway. The Application Server 112 serves as the call control function of the conferencing server. It performs all resource management, call flow, and data routing within the system and communicates with all entities in the system via Session Initiated Protocol (SIP) based messaging. The Session Initiated Protocol or SIP is a protocol defined by the Internet Engineering Task Force (IETF) and documented under standard RFC3261.

The Conferencing Database 114 tracks state or status data for each conference currently active at any given time. It also generates new conference identifiers as required by the requests from the Application Server. The Conferencing Media Servers 116 are used to combine multiple conference participants' audio together for sharing amongst all conference participants. Conferencing Media Servers will use Voice over IP (VoIP) technologies or more generally packet based communications. All devices within the Conferencing System communicate via an internal IP network or backbone 118. This backbone serves as a common communication point between entities and their mates and allows un-inhibited communication amongst all entities on the network.

Continuing to utilize FIG. 1 as reference, a typical domestic conference call setup is depicted in the following text in accordance with a preferred embodiment of the embodiment of the disclosure. Participant dials a pre-defined telephone number to call into a given conference. Based on translations occurring in the PSTN, the call is routed to Conferencing System. The call initially terminates at the Media Gateway. The Media Gateway prompts the participant to enter a pass code, conference code, or other conferencing configuration information. The participant may respond using several different methods. For example, the participant could generate Dual-Tone Multi-Frequency signals by pushing a phones keypad. Other examples include keystrokes from a computer's keyboard, speech signals, or other data input. For simplicity purposes, it will be assumed that participant responds by entering DTMF digits from the phone's keypad. At this point, Dual-Tone Multiple-Frequency (DTMF) signals are sent back to the Media Gateway for decoding and processing.

Once conferencing information is obtained from participant, this information is forwarded to the provisioning database for validation and authorization. The provisioning database is the interface where the service provider provisions conferencing hosts when signing up for conferencing services. Once receiving the conferencing information from the Media Gateway, the provisioning database confirms that conference code is a valid code in its provisioned database and available for conference usage. After validity checks are complete, the provisioning database responds back to the Media Gateway with a signal indicating the validity or invalidity of the conference code submitted by participant. If the conference code submitted by the participant is invalid, the Media Gateway will request from participant to re-key in conferencing information. This cycle will continue for a defined set of times as configured on the Media Gateway. If the number of failures exceeds the number configured on the Media Gateway, the call can either be terminated or directed to a directory assistance number for support as required.

Assuming the conferencing information that was submitted by participant is valid, the Media Gateway communicates with the Application Server requesting that the caller be added to a conference. The Application Server will forward the appropriate conferencing information to the Conferencing Database for further processing. The Application Server maintains a list of all available resources in the Conferencing Database and uses this information to intelligently execute proper resource management and load balancing across all databases for efficient utilization of resources.

As well, the Application Server maintains constant knowledge of the external devices or SIP endpoints it communicates with. This is achieved through registration messages to the Application Server at startup or through periodic audits. In this manner, the Application Server can determine which SIP devices are currently up and running and can maintain the status of each SIP device accordingly. When audits fail, the Application Server can take appropriate action to flag or alarm these specific devices appropriately and remove these resources from its allocation algorithms.

Once the Conferencing Database receives the conferencing information from the Application Server, the Conferencing Database will determine if a conference associated with the entered conference code already exists. If not, the Conferencing Database will create a new conference and associate a unique conference identifier for the new conference. The Conferencing Database will associate the new conference identifier to the conference code entered by participant.

The Conferencing Database will then ask the Application Server to select an available Conferencing Media Server to be assigned for this conference. Assuming availability of a suitable conferencing media server, the Application Server supplies the Conferencing Media Server a unique identifier back to the Conferencing Database. The Conferencing Database then ships the unique conference identifier and conferencing media server identifier to the Media Gateway so that it can associate participant and any other incoming conference calls with the same conference code identifier to a specific Conferencing Media Server. The Conferencing Database also instructs the Media Gateway to connect participant to the selected Conferencing Media Server. The Conferencing Database also requests the Media Gateway to send IP/port data to the selected Conferencing Media Server for routing conference stream data between the Media Gateway and the selected Conferencing Media Server.

The selected Conferencing Media Server responds to the Media Gateway with the actual IP/port information that will be used for passing the conferencing media between the Conferencing Media Server and the Media Gateway for communication with the participant. The Conferencing Media Server also provides the Media Gateway with information related to any media descriptions or codec's that the Media Gateway will need to handle the conferencing stream as passed between the Media Gateway and the selected Conferencing Media Server. Upon receiving this response from the selected Conferencing Media Server, the Media Gateway activates its Real Time Transport Protocol (RTP) stream—or similar "real time" protocol—and the participant is now in the conference. RTP is a protocol defined by the IETF (Internet Engineering Task Force) for streaming real time multimedia over an IP network in packets. At this point, the Media Gateway and the selected Conferencing Media Server are now connected via a local area network and all multimedia communication is transitioning through these devices in the form of packets. The Conferencing Database is updated to show that the Media Gateway and the participant are in the conference, and the status of each of the various devices in the discussion herein, as well as the overall status of the conference itself, is updated with the Conferencing Database periodically.

The above description covered the scenario for the setup of a new conference. For participant to join an existing conference, the Conferencing Database, once receiving the initial conferencing information from the Application Server, would locate an existing conference identifier corresponding to the conference code entered by the participant. In this case, Conferencing Database would then forward to the Media Gateway the identifier of the Conferencing Media Server that was selected to host the conference. The Media Gateway would then send an invite message to the selected Conferencing Media Server. The selected Conferencing Media Server would respond with the IP/port data that the Conferencing Media Server would use for transmitting the conference stream media to the participant via the Media Gateway. The Media Gateway would then activate its RTP stream and the participant would now be joined in the conference. The Conferencing Database would be updated accordingly as with what occurs in the new setup scenario.

The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 2:
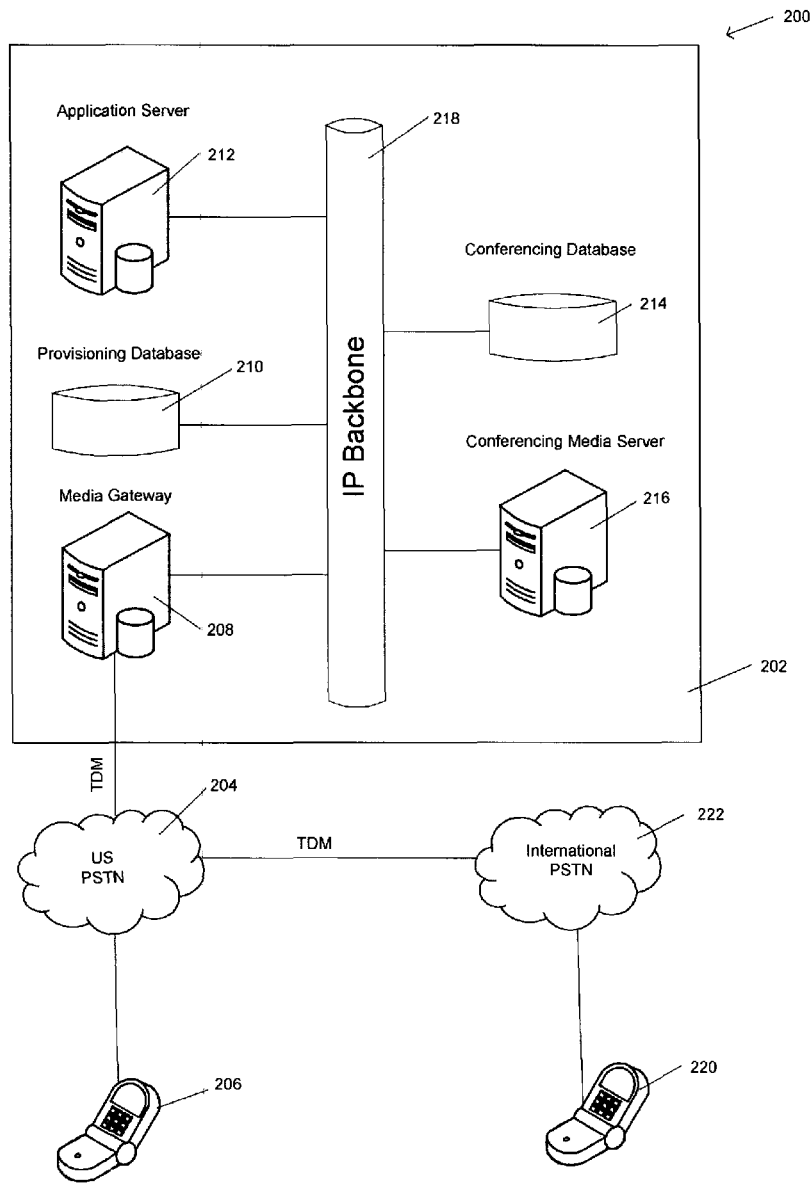
FIG. 2 depicts an international conferencing scenario in accordance with a preferred embodiment of the embodiment of the disclosure.

With reference now to FIG. 2, an international conferencing scenario 200 is depicted in accordance with a preferred embodiment of the embodiment of the disclosure. Figure is identical to FIG. 1 except for showing how an international conferencing participant would gain access to a typical conference call. The conferencing system 202 in FIG. 2 is a typical representation of a conferencing system that utilizes an Internet Protocol (IP) based backbone distributed architecture. In addition, also depicted in FIG. 2 is a Public Switched Telephone Network (PSTN) 204. In the figure, interfacing the conferencing system and the PSTN is a Time Division Multiplexing (TDM) interface or T1 line. The interface between the conferencing system and the PSTN can be any communication interface that is supported by both ends. T1 lines will be used in these illustrations since this medium is well known in the art.

Conferencing Participant 206 is connected to the Conferencing System through the PSTN. Conferencing participants can be in the form of any medium capable of successfully communicating with the PSTN. It should also be noted that participants do not need to be routed through the PSTN. In some instances, IP phones or even wireless systems could be routed directly to the Media Gateway without needing to route through the local PSTN.

Continuing to reference FIG. 2, Conferencing System is made up of multiple communication entities. It should be noted that each device represented can have multiple instances within the architecture. FIG. 2 depicts only one instance of each entity for simplification purposes. Media Gateway 208 is used to interface with the PSTN or other external network entities. It serves as the participant interface and collects and distributes participant information as needed. Provisioning Database 210 is used for validating conferencing information sent to it by the Media Gateway. The Application Server 212 serves as the call control function of the conferencing server. It performs all resource management, call flow, and data routing within the system and communicates with all entities in the system via Session Initiated Protocol (SIP) based messaging.

The Conferencing Database 214 tracks state or status data for each conference currently active at any given time. It also generates new conference identifiers as required by the requests from the Application Server. The Conferencing Media Servers 216 are used to combine multiple conference participants' audio together for sharing amongst all conference participants. Conferencing Media Servers will use Voice over IP (VoIP) technologies or more generally packet based communications. All devices within the Conferencing System communicate via an internal IP network or backbone 218. This backbone serves as a common communication point between entities and their mates and allows un-inhibited communication amongst all entities on the network.

As can be illustrated in FIG. 2, Conferencing Participant 220 would dial a pre-defined telephone number of the Conferencing System. Since Participant is not at the same international location as the Conferencing System, international dialing would be required along with international billing call rates. Once Participant dials the appropriate digits to establish or join the conference call, the International PSTN 222 would translate the dialed stream and route the call appropriately over a dedicated, international circuit based on its translation tables. Call would eventually be routed to the local premise PSTN and be routed to the Media Gateway. As is well understood in the art, multiple circuit based switches are utilized to route a call internationally. FIG. 2 is simplified for illustration purposes only.

The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 3:
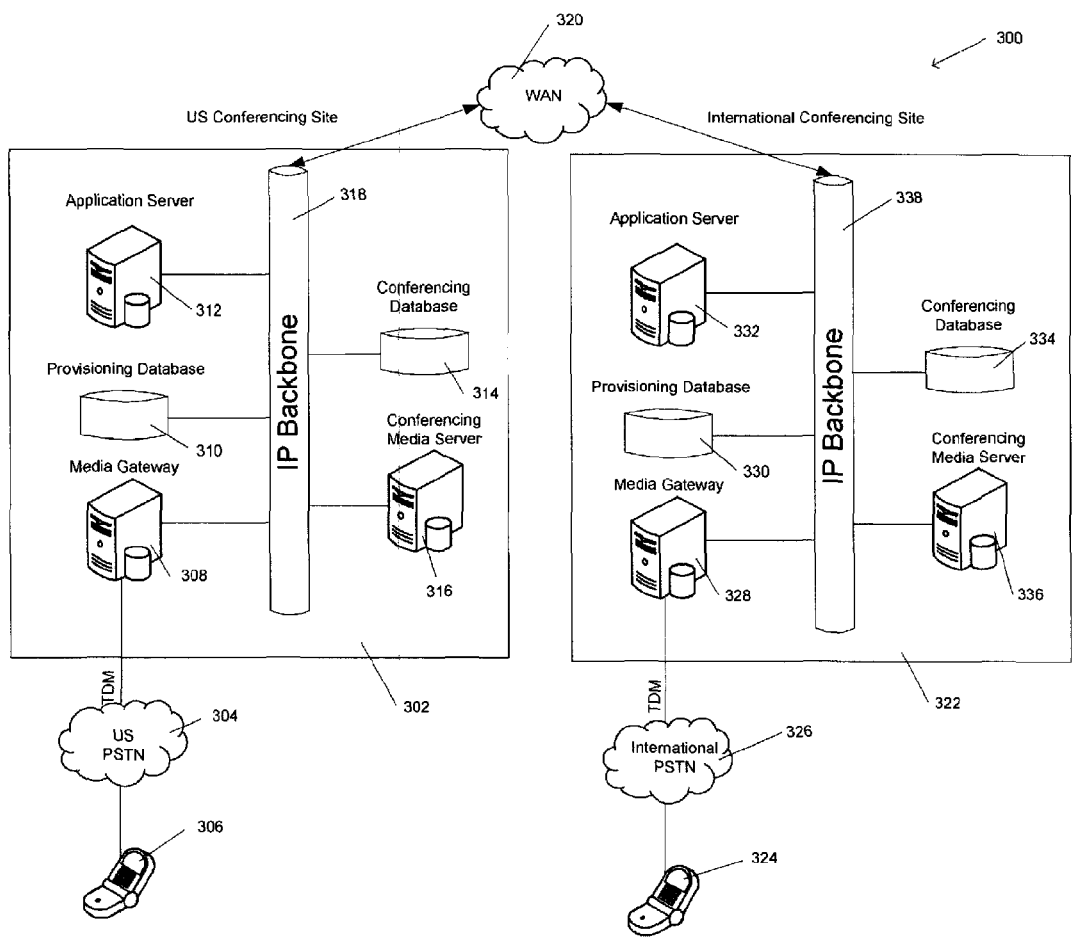
FIG. 3 depicts a further international conferencing scenario utilizing localized, cascaded Conferencing Media Servers in accordance with a preferred embodiment of the embodiment of the disclosure.

With reference next to FIG. 3, a diagram of a Cascaded Media Server International Conferencing scenario is depicted in accordance with a preferred embodiment of the embodiment of the disclosure. The US conferencing system 302 in FIG. 3 is a typical representation of a conferencing system that utilizes an Internet Protocol (IP) based backbone distributed architecture. In addition, also depicted in figure is a Public Switched Telephone Network (PSTN) 304. In the figure, interfacing the conferencing system and the PSTN is a Time Division Multiplexing (TDM) interface or T1 line.

The interface between the conferencing system and the PSTN can be any communication interface that is supported by both ends. Conferencing Participant 306 is connected to the Conferencing System through the PSTN. The US Conferencing System is made up of multiple communication entities. It should be noted that each device represented can have multiple instances within the architecture. Media Gateway 308 is used to interface with the PSTN or other external network entities. It serves as the participant interface and collects and distributes participant information as needed. Provisioning Database 310 is used for validating conferencing information sent to it by the Media Gateway.

The Application Server 312 serves as the call control function of the conferencing server. It performs all resource management, call flow, and data routing within the system and communicates with all entities in the system via Session Initiated Protocol (SIP) based messaging. The Conferencing Database 314 tracks state or status data for each conference currently active at any given time. It also generates new conference identifiers as required by the requests from the Application Server. The Conferencing Media Servers 316 are used to combine multiple conference participants' audio together for sharing amongst all conference participants. Conferencing Media Servers will use Voice over IP (VoIP) technologies or more generally packet based communications. Devices within the Conferencing System communicate via an internal IP network or backbone 318.

A Wide Area Network (WAN) 320 connects the US conferencing site to an International conferencing site 322. The new conference call is established as described above. International Conferencing Participant 324 is located at an international site with respect to the hosting Conferencing System and needs to join the existing conference call. Participant dials a "local" conferencing number to access the conference call. The International PSTN 326 (local to Participant and Participant's Conferencing System) translates the dialed digits and routes the call to the Media Gateway 328.

The Media Gateway prompts the Participant to enter a pass code, conferencing code, or other conference configuration information. The Media Gateway then forwards this information to the Provisioning Database 330 for validity checking. The Provisioning Database responds to the Media Gateway with the validity or invalidity of the conference code and other information submitted by Participant. Assuming Participant's information is valid, the Media Gateway passes a message containing conference code to the Application Server 332 requesting that Participant be added to a conference. The Application Server determines an available Conferencing Database 334 based off of resource utilization queues and routes this request to the first available database.

Conferencing Database provides methods for determining site specific information with respect to incoming conference codes. Participant entered a conference code to access a conference being hosted at a different site and by a different conferencing system. Conferencing Database receives the conferencing request from Application Server and performs analysis on the first three digits of the conference code to determine the host location of the conference. Conference Codes are distributed at each conferencing site and are "site" specific. These conferencing codes can be directly linked to dialing sequences specific to that site's dial plan or can be generically assigned per site. It is the responsibility of the conferencing administrator to assign unique conference codes per site.

Conferencing Database determines that Participant wants to join a conference call at the Conferencing System site. Conferencing System request IP/Port Data from Conferencing Database on Conferencing System via a packetized message over the WAN. Conferencing Database determines that Conferencing Media Server 336 is currently allocated to the specific, requested conference and determines if Conferencing Media Server has available ports to accept another entry to the conference. If Conferencing Media Server does not have available ports, a negative acknowledgement is sent back to Conferencing Database and Participant is not allowed into the conference. Assuming ports are available on Conferencing Media Server, a positive acknowledgement is sent back to Conferencing Database. At this point, Conferencing Database then determines if Conferencing Media Server resources are available locally.

The conferencing database sends a request to Conferencing Media Server for determination of available resources. If the selected Conferencing Media Server has available resources, that resource is allocated to the requested conference call and the Conferencing Database is updated appropriately along with the Application Server. The Conferencing Database then requests that the Media Gateway send a proposed set of IP/Port data to the selected Conferencing Media Server for routing conferencing stream data between the Media Gateway and the Conferencing Media Server.

The selected Conferencing Media Server responds to the Media Gateway with the actual IP/Port information that will be used for passing the conferencing media between the Media Server and the Media Gateway for communication with Participant. The Conferencing Media Server also supplies the Media Gateway with any descriptions or codec's that the Media Gateway may need to handle the conferencing stream. Upon receiving this response from the selected Conferencing Media Server, the Media Gateway activates its RTP stream and Participant is joined into the conference.

The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 4:
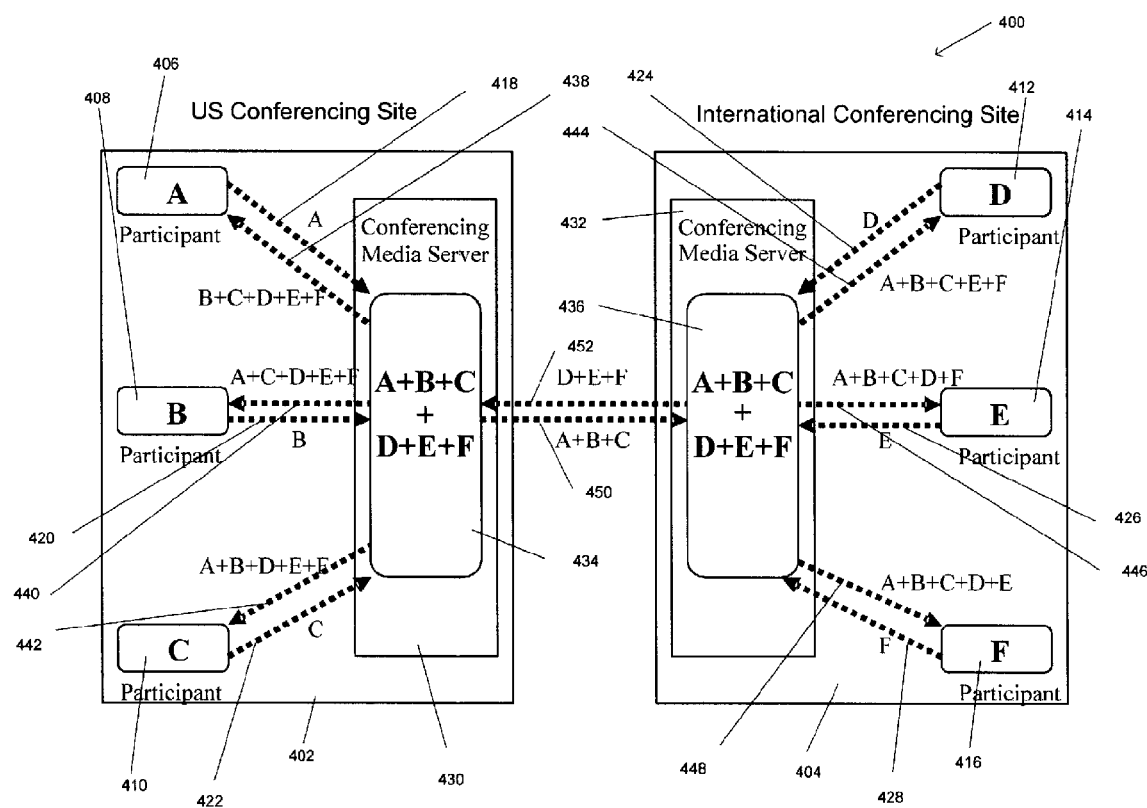
FIG. 4 depicts an illustration of the audio summing and distribution functions of the cascaded Conferencing Media Servers in accordance with a preferred embodiment of the embodiment of the disclosure.

With reference now to FIG. 4, a block diagram of the cascaded Media Server's audio streaming 400 is depicted in accordance with an embodiment of the disclosure. Conferencing System 402 and 404 are examples of Conferencing System's of FIG. 3. FIG. 4 represents the method by which RTP packet audio streams are combined and distributed in said example. All "dotted" lines represent RTP streams for audio sharing amongst all participants. Each participant A, 406, B, 408, C, 410, D, 412, E, 414 and F 416 (or SIP endpoint) sends an RTP audio stream 418, 420, 422, 424, 426 and 428 to a near Conferencing Media Server 430 and 432. The Conferencing Media Server sums all audio feeds together 434 and 436, but ensures that no participant will receive an echo of their own audio 438, 440, 442, 444, 446 and 448. Single RTP streams 450 and 452 are established per conference between each pair of Conferencing Media Servers to share near participant audio streams with far end media servers.

The codec between Conferencing Media Servers is, for example, G.711. G.711 is an international protocol for encoding telephone audio on a 64 Kbps channel. The system can use any codec between media servers since the stream will be normalized prior to the re-mixing process. Participant's A, B and C's audio in Conferencing System is transmitted over a single RTP stream to Conferencing System. Participant's D, E, and F's audio in Conferencing System is transmitted over a single RTP stream to Conferencing System. Each Conferencing Media Server performs summing functions on the audio packets and distributes only the required audio packets to the participants.

Figure 5:
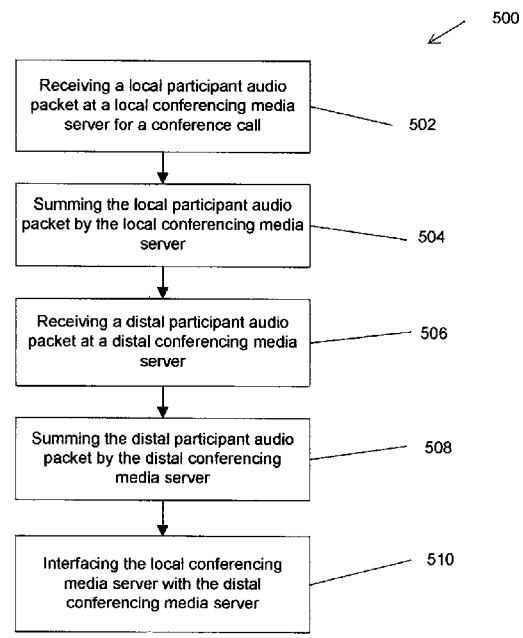
FIG. 5 depicts a first flow diagram of the method for international conferencing via globally distributed cascade media servers in accordance with an embodiment of the disclosure.

Referring now to FIG. 5, a first method of international conferencing via globally distributed cascading media servers 500 is depicted and comprises a number of blocks or modules that are software, hardware, or firmware, and/or the combination of software, hardware, and/or firmware. A method of international conferencing via globally distributed cascading media servers that comprises, receiving 502 a local participant audio packet at a local conferencing media server in a conference call, summing 504 the local participant audio packet by the local conferencing media server, receiving 506 a distal participant audio packet at a distal conferencing media server, summing 508 the distal participant audio packet by the distal conferencing media server, and interfacing 510 the local conferencing media server with the distal conferencing media server. The transfer of information occurs via at least one of: a wireless protocol, a wired protocol and a combination of the wireless protocol and the wired protocol.

Figure 6:
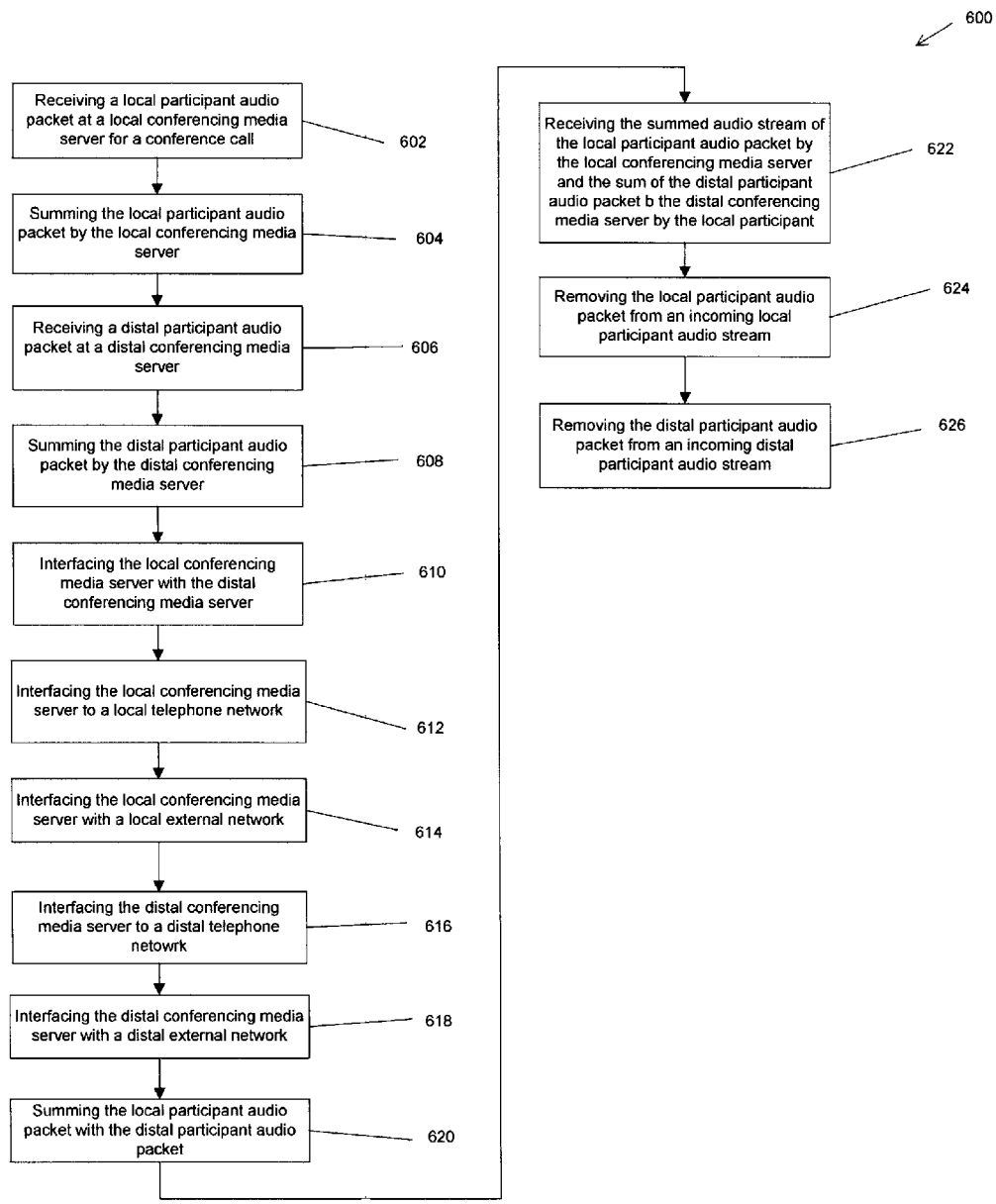
FIG. 6 depicts a second flow diagram of the method for international conferencing via globally distributed cascade media servers in accordance with an embodiment of the disclosure.

Referring now to FIG. 6, a second method of international conferencing via globally distributed cascading media servers 600 is depicted and comprises a number of blocks or modules that are software, hardware, or firmware, and/or the combination of software, hardware, and/or firmware. A method of international conferencing via globally distributed cascading media servers that comprises, receiving 602 a local participant audio packet at a local conferencing media server in a conference call, summing 604 the local participant audio packet by the local conferencing media server, receiving 606 a distal participant audio packet at a distal conferencing media server, summing 608 the distal participant audio packet by the distal conferencing media server, and interfacing 610 the local conferencing media server with the distal conferencing media server. The method may also comprise interfacing 612 the local conferencing media server to a local telephone network, wherein the local telephone network comprises at least one of, a public switched telephone network, a voice over internet protocol network, and a cellular network. The method may additionally comprise interfacing 614 the local conferencing media server with a local external network, interfacing 616 the distal conferencing media server to a distal telephone network, interfacing 618 the distal conferencing media server with a distal external network, and summing 620 the local participant audio packet with the distal participant audio packet. The method may also comprise receiving 622 the summed audio stream of the local participant audio packet by the local conferencing media server and the sum of the distal participant audio packet by the distal conferencing media server by the local participant, removing 624 the local participant audio packet from the summed audio stream incoming to the local participant and removing 626 the distal participant audio packet from the summed audio stream incoming to the distal participant. The transfer of information occurs via at least one of: a wireless protocol, a wired protocol and a combination of the wireless protocol and the wired protocol.

Figure 7:
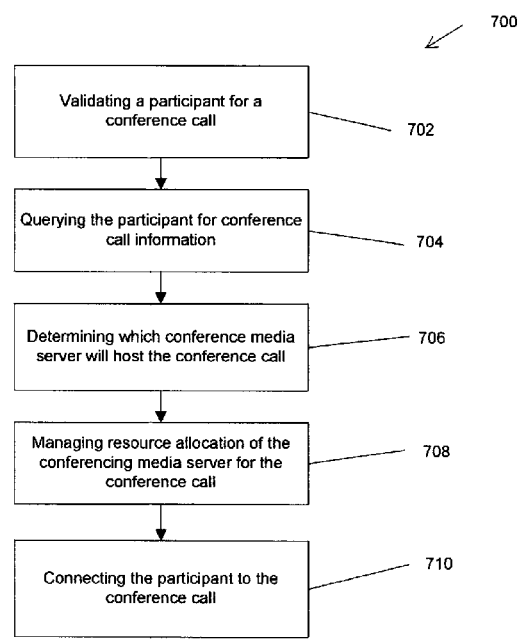
FIG. 7 depicts a first software block accordance with an embodiment of the disclosure.

Referring now to FIG. 7, a first software flow block 700 of international conferencing via globally distributed cascading media servers is depicted. A computer readable medium that comprises instructions for, validating 702 a participant for a conference call, querying 704 the participant for conference call information, determining 706 which conferencing media server will host the conference call, managing 708 resource allocation of the conferencing media server for the conference call, and connecting 710 the participant to the conference call. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 8:
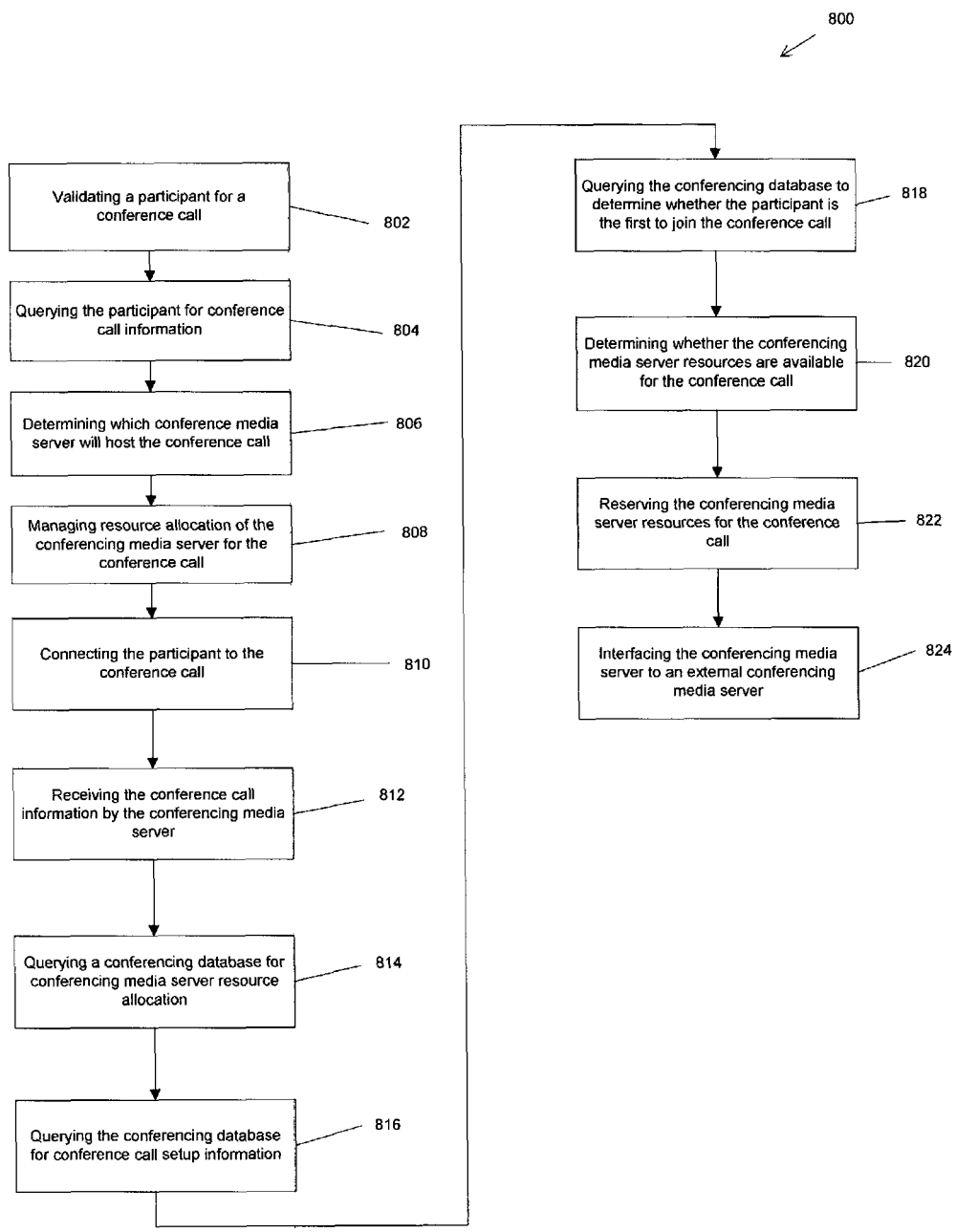
FIG. 8 depicts a second software block accordance with an embodiment of the disclosure.

Referring now to FIG. 8, a second software flow block 800 of international conferencing via globally distributed cascading media servers is depicted. A computer readable medium that comprises instructions for, validating 802 a participant for a conference call, querying 804 the participant for conference call information, determining 806 which conferencing media server will host the conference call, managing 808 resource allocation of the conferencing media server for the conference call, and connecting 810 the participant to the conference call. The computer readable medium may also comprise instructions for receiving 812 the conference call information by the conferencing media server, querying 814 a conferencing database for conferencing media server resource allocation, querying 816 the conferencing database for conference call setup information and querying 818 the conferencing database to determine in the participant is the first to join the conference call. The computer readable medium may further comprise determining 820 whether conferencing media server resources are available for the conference call, reserving 822 conferencing media server resources for the conference call and interfacing 824 the conferencing media server to an external conferencing media server. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

The description of the embodiment of the disclosure has been presented for purposes of illustration and description, but is not intended to be exhaustive or limited to the invention in the present form discussed. Many modifications and variations will be apparent to those of ordinary skill in the art. For example, although the discussion in the embodiment of the disclosure focuses on RTP (Real Time Protocol) based routing, other forms of "real time" routing methods such as MPLS (Multi-Protocol Label Switching) could be utilized. As well, although TDM (Time Division Multiplexing) is used to connect participants to PSTNs and PSTNs to conferencing systems, other alternatives such as wireless access and Digital PBX/packet connectivity could be used as well. The embodiment was chosen and described in order to best explain the principles of the invention, the practical application, and to enable others of ordinary skill in the art to understand the invention for various embodiments with various modifications as are suited to the particular use contemplated.

Systems, methods, devices and computer readable media have been shown and/or described in the above embodiments for international conferencing via distributed cascading media servers. Although the above descriptions set forth preferred embodiments, it will be understood that there is no intent to limit the embodiment of the disclosure by such disclosure, but rather, it is intended to cover all modifications and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method of international conferencing via globally distributed cascading media servers, comprising:
    dialing, by each local participant located in the United States, a pre-defined access number to access a local media gateway;
    accessing, by the each local participant, the local media gateway;
    validating, by the local media gateway, the each local participant;
    quarrying, by the local media gateway, the each local participant for information to establish the each local participant into a specific conference call;
    transmitting, by the local media gateway, the information to a local application server;
    communicating, by the local application server, with a local conferencing database;
    determining, by the local application server, if resources for the specific conference call have already been allocated and the specific conference call is currently setup and which one of the each local participant is a first participant to join the specific conference call;
    transmitting, by the local conferencing database, to the local application server information identifying a local Internet Protocol based conferencing media server that is hosting the specific conference call;
    receiving, from the each local participant, a local participant audio packet at the local Internet Protocol based conferencing media server for the specific conference call;
    summing the each local participant audio packet by the local Internet Protocol based conferencing media server to create a summed audio stream of the each local participant audio packet;
    dialing, by each distal participant located in another country other than the United States, a pre-defined access number to access a distal media gateway;
    accessing, by the each distal participant, the distal media gateway;
    validating, by the distal media gateway, the each distal participant;
    quarrying, by the distal media gateway, the each distal participant for information to establish the each distal participant into the specific conference call;
    transmitting, by the distal media gateway, the information to a distal application server;
    communicating, by the distal application server, with a distal conferencing database;
    determining, by the distal application server, if resources for the specific conference call have already been allocated and the specific conference call is currently setup and which one of the each distal participant is a first participant to join the specific conference call;
    transmitting, by the distal conferencing database, to the distal application server information identifying a distal Internet Protocol based conferencing media server that is hosting the specific conference call;
    receiving, from the each distal participant, a distal participant audio packet at the distal Internet Protocol based conferencing media server for the specific conference call;
    summing each distal participant audio packet by the distal Internet Protocol based conferencing media server to create a summed audio stream of the each distal participant audio packet; and
    interfacing the local Internet Protocol based conferencing media server with the distal Internet Protocol based conferencing media server;
    summing the summed audio stream of the each local participant audio packet with the summed audio stream of the each distal participant audio packet;
    receiving, at a local participant, the summed audio stream of the each local participant audio packet from the local conferencing media server and the summed audio stream of the each distal participant audio packet from the distal conferencing media server; and removing the local participant audio packet from the summed audio stream incoming to the local participant; and
    receiving, at a distal participant, the summed audio stream of the each local participant audio packet from the local conferencing media server and the summed audio stream of the each distal participant audio packet from the distal conferencing media server; and removing the distal participant audio packet from the summed audio stream incoming to the distal participant.

2. The method of claim 1 comprising: interfacing the local conferencing media server to a local telephone network.

3. The method of claim 2 wherein the local telephone network comprises at least one of: a public switched telephone network; a voice over Internet protocol network; and a cellular network.

4. The method of claim 1 comprising: interfacing the local conferencing media server with a local external network.

5. The method of claim 1 comprising: interfacing the distal conferencing media server to a distal telephone network.

6. The method of claim 1 comprising: interfacing the distal conferencing media server with a distal external network.

7. A non-transitory computer readable storage medium comprising instructions that when executed by a processor perform:
    validating, by a local media gateway located in the United States, each local participant;
    quarrying, by the local media gateway, the each local participant for information to establish the each local participant into a specific conference call;
    transmitting, by the local media gateway, the information to a local application server;
    communicating, by the local application server, with a local conferencing database;
    determining, by the local application server, if resources for the specific conference call have already been allocated and the specific conference call is currently setup and which one of the each local participant is a first participant to join the specific conference call;

transmitting, by the local conferencing database, to the local application server information identifying a local Internet Protocol based conferencing media server that is hosting the specific conference call;

receiving, from the each local participant, a local participant audio packet at the local Internet Protocol based conferencing media server for the specific conference call;

summing the each local participant audio packet by the local Internet Protocol based conferencing media server to create a summed audio stream of the each local participant audio packet;

validating, by a distal media gateway located in another country other than the United States, each distal participant;

quarrying, by the distal media gateway, the each distal participant for information to establish the each distal participant into the specific conference call;

transmitting, by the distal media gateway, the information to a distal application server;

communicating, by the distal application server, with a distal conferencing database;

determining, by the distal application server, if resources for the specific conference call have already been allocated and the specific conference call is currently setup and which one of the each distal participant is a first participant to join the specific conference call;

transmitting, by the distal conferencing database, to the distal application server information identifying a distal Internet Protocol based conferencing media server that is hosting the specific conference call;

receiving, from the each distal participant, a distal participant audio packet at the distal Internet Protocol based conferencing media server for the specific conference call;

summing each distal participant audio packet by the distal Internet Protocol based conferencing media server to create a summed audio stream of the each distal participant audio packet; and interfacing the local Internet Protocol based conferencing media server with the distal Internet Protocol based conferencing media server;

summing the summed audio stream of the each local participant audio packet with the summed audio stream of the each distal participant audio packet;

receiving, at a local participant, the summed audio stream of the each local participant audio packet from the local conferencing media server and the summed audio stream of the each distal participant audio packet from the distal conferencing media server; and removing the local participant audio packet from the summed audio stream incoming to the local participant; and receiving, at a distal participant, the summed audio stream of the each local participant audio packet from the local conferencing media server and the summed audio stream of the each distal participant audio packet from the distal conferencing media server; and removing the distal participant audio packet from the summed audio stream incoming to the distal participant.

8. The non-transitory computer readable storage medium of claim 7 comprising: reserving the distal Internet Protocol based conferencing media server resources and the local Internet Protocol based conferencing media server resources for the conference call.

9. A system of international conferencing via globally distributed cascading media servers comprising:

receive, at a local media gateway, a pre-defined access number from each local participant located in the United States;

access, by the each local participant, the local media gateway;

validate, by the local media gateway, the each local participant;

quarry, by the local media gateway, the each local participant for information to establish the each local participant into a specific conference call;

transmit, by the local media gateway, the information to a local application server;

communicate, by the local application server, with a local conferencing database;

determine, by the local application server, if resources for the specific conference call have already been allocated and the specific conference call is currently setup and which one of the each local participant is a first participant to join the specific conference call;

transmit, by the local conferencing database, to the local application server information identifying a local Internet Protocol based conferencing media server that is hosting the specific conference call;

receive, from the each local participant, a local participant audio packet at the local Internet Protocol based conferencing media server for the specific conference call;

sum the each local participant audio packet by the local Internet Protocol based conferencing media server to create a summed audio stream of the each local participant audio packet;

receive, at a distal media gateway, a pre-defined access number from each distal participant located in another country other than the United States;

access, by the each distal participant, the distal media gateway;

validate, by the distal media gateway, the each distal participant;

quarry, by the distal media gateway, the each distal participant for information to establish the each distal participant into the specific conference call;

transmit, by the distal media gateway, the information to a distal application server;

communicate, by the distal application server, with a distal conferencing database;

determine, by the distal application server, if resources for the specific conference call have already been allocated and the specific conference call is currently setup and which one of the each distal participant is a first participant to join the specific conference call;

transmit, by the distal conferencing database, to the distal application server information identifying a distal Internet Protocol based conferencing media server that is hosting the specific conference call;

receive, from the each distal participant, a distal participant audio packet at the distal Internet Protocol based conferencing media server for the specific conference call;

sum each distal participant audio packet by the distal Internet Protocol based conferencing media server to create a summed audio stream of the each distal participant audio packet; and interface the local Internet Protocol based conferencing media server with the distal Internet Protocol based conferencing media server;

sum the summed audio stream of the each local participant audio packet with the summed audio stream of the each distal participant audio packet;

receive, at a local participant, the summed audio stream of the each local participant audio packet from the local conferencing media server and the summed audio stream of the each distal participant audio packet from the distal conferencing media server; and removing the local participant audio packet from the summed audio stream incoming to the local participant; and receive, at a distal participant, the summed audio stream of the each local participant audio packet from the local conferencing media server and the summed audio stream of the each distal participant audio packet from the distal conferencing media server; and removing the distal participant audio packet from the summed audio stream incoming to the distal participant.

10. The system of claim 9 wherein the local media gateway and the distal media gateway is are communicably connected to at least one of: a public switched telephone network; a voice over internet protocol network; and a cellular network.

\* \* \* \* \*